Jan. 19, 1932.     L. H. OBERREICH     1,841,668
CUSHION REBOUND CHECK
Filed June 17, 1927     2 Sheets-Sheet 2
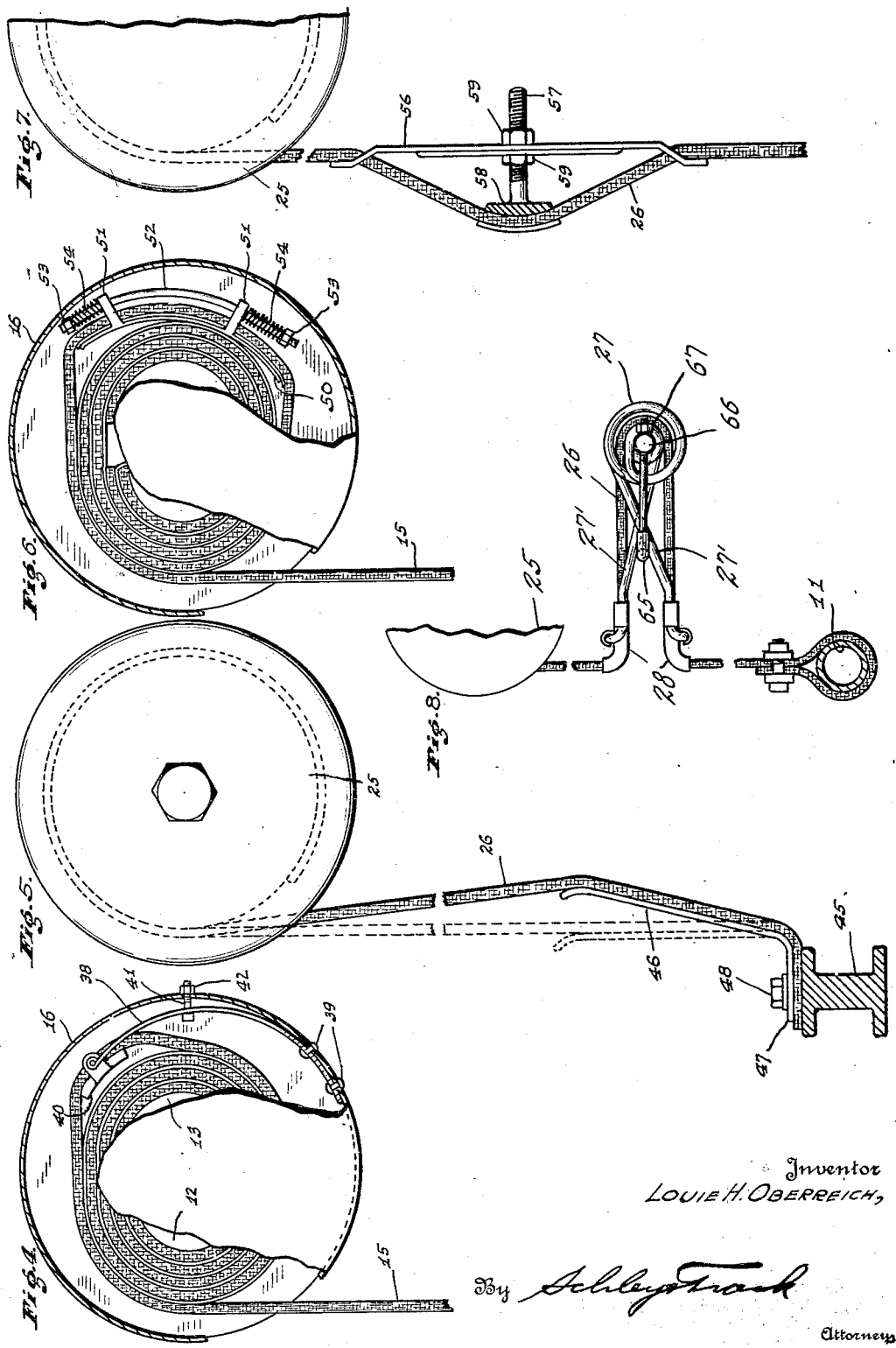

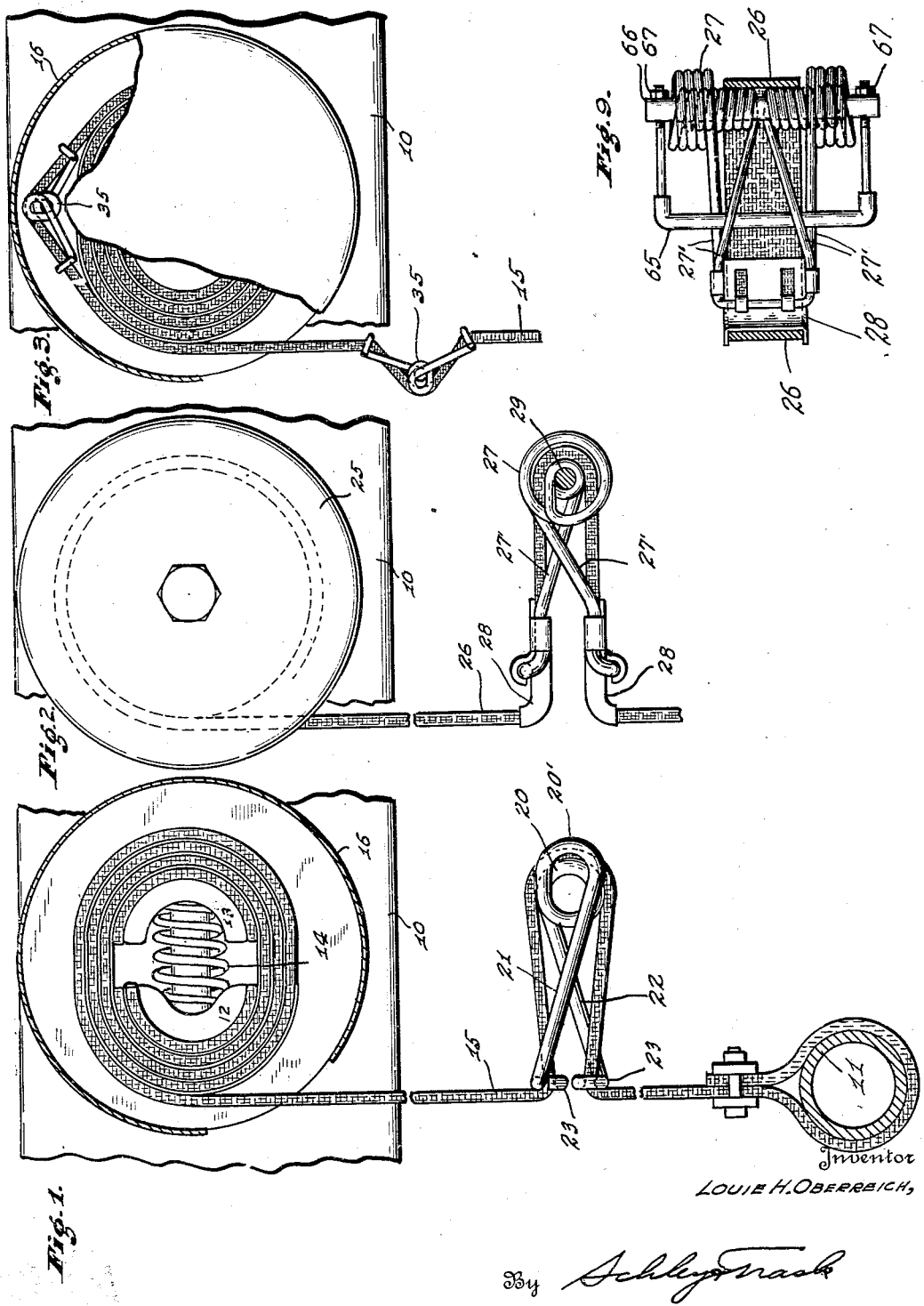

Patented Jan. 19, 1932

1,841,668

UNITED STATES PATENT OFFICE

LOUIE H. OBERREICH, OF INDIANAPOLIS, INDIANA

CUSHION REBOUND CHECK

Application filed June 17, 1927. Serial No. 199,484.

My invention is concerned with shock absorbers for automobiles, and it is my object to combine a cushion rebound check with a snubber or shock absorber to supplement the action of such snubber or shock absorber and to make the initial checking of rebound easy and comfortable instead of sudden and severe.

My invention is particularly adapted for use in connection with shock absorbers or snubbers having a flexible strap, and I accomplish my desired object by providing a yielding device such as a spring which co-operates with the strap to modify the action of the shock absorber or snubber so that a certain amount of rebound may occur in the vehicle before the full retarding influence of the shock absorber or snubber is effective.

The accompanying drawings illustrate my invention; Fig. 1 is a side elevation of my invention embodied in the combination of a friction snubber with an auxiliary spring carried by the strap which connects the snubber with the vehicle axle; Fig. 2 is a view similar to Fig. 1 but showing a different type of shock absorber and a more elaborate form of auxiliary spring; Fig. 3 is a view similar to the preceding figure showing a somewhat different arrangement of the auxiliary springs; Figs. 4 and 5 are views showing modified forms of auxiliary springs; Figs. 6 and 7 show still further modifications of auxiliary springs, the spring in these two figures being adjustable; Fig. 8 is an elevation of a device similar to that shown in Fig. 2 but with the addition of means to adjust the auxiliary spring; and Fig. 9 is a plan of the construction shown in Fig. 8 with the strap partly broken away.

The subject-matter of this application is in part disclosed in my co-pending application Serial No. 697,126, filed March 5, 1924, now Patent No. 1,636,386, granted July 19, 1927. In such prior application and the patent granted thereon, I have claimed certain types of springs, both alone and in combination with straps, and there are no claims in that patent to the combination of such spring or any other spring with a frictional rebound resistor, although such combination was disclosed. Claims to such combination appear in this application, in which application I also disclose combinations embodying types of springs other than those shown in my prior application.

My invention is adapted to be mounted on a vehicle and to act between two parts of the vehicle which tend to separate when rebound occurs. Such two vehicle-parts are conveniently the frame 10 and the axle 11. On the frame 10, I mount a friction shock absorber or snubber which may be of any well known type. In Fig. 1, the shock absorber is shown as embodying a pair of relatively movable shoes 12 and 13 which are spring-pressed apart as by means of the compression spring 14 acting between them. One of these shoes, here shown as the shoe 12, is secured to the frame 10, and a strap 15 is secured to the shoe 12 and is wound for several turns into a spiral enclosing both shoes, the free end of the strap 15 being secured to the axle 11. A casing 16 surrounds the shoes 12 and 13 and the strap turns about them.

Carried by the stretch of the strap extending to the axle 11, I provide a coil spring 20, preferably a helical coil spring, terminating in two transversely extending arms 21 and 22. The two arms of the spring desirably cross each other and are associated at their ends with the strap 15 so that the arms 21 and 22 will be pulled apart and the spring 20 wound when the axle 11 moves away from the frame 10. The spring shown in Fig. 1 is a relatively simple form of spring formed wholly of a continuous piece of wire. This spring consists of a helical portion preferably slightly longer than the width of the strap, with the arms 22 and 21 projecting from the ends of the helical portion, and with the free ends of the arms formed into flat eyes 23 which receive the strap 15. To prevent the strap from slipping over the ends of the helical portion of the spring 20 I may form the end turns 20' of the spring so that they are offset oppositely from the direction in which the arms 21 and 22 project.

In the construction shown in Fig. 2, I provide a somewhat different form of shock absorber. This type of shock absorber includes a drum 25 rotatably mounted on the frame 10. A friction brake is operatively connected to the drum 25 through a uni-directional clutch which permits the brake to oppose rotation of the drum in one direction while permitting free rotation in the other direction. Rotation of the drum in one direction is accomplished by means of a spring and in the other direction by means of a strap 26 which extends part way around the drum and to the axle or to some other part which moves away from the frame 10 during rebound. I have not shown details of this shock absorber, as devices of this type are old and well known, one such shock absorber being shown in the Feilke and Kline Patent No. 1,492,681, granted May 6, 1924. Co-operating with the strap 26 is an auxiliary spring 27 which has the same function as the spring 20 shown in Fig. 1. The spring 27, however, is a somewhat more elaborate form of spring, the helical part consisting of inner and outer portions and the ends of the arms 27' being provided with wearing shoes 28 through which the strap slides as the spring is strained. A bolt or pin 29 extending through the inner portion of the helical coil prevents distortion thereof. This form of spring is described more completely and claimed in my co-pending application mentioned above.

In the operation of the two devices shown in Figs. 1 and 2, the springs 20 and 27 supplement and modify the action of the shock absorber. The springs 20 and 27 wholly take the easy rebound shocks and resist all rebound initially until the spring-arms approach sufficiently close to alinement to bring the shock absorber or snubber into operation. I am thus enabled to avoid the usual sudden rebound checking of the snubber or shock absorber, for rebounds are initially opposed by the auxiliary spring. It will be evident that the extent of rebound which must occur before the shock absorber or snubber becomes fully effective in opposing further rebound will depend upon the arrangement and the relative strength of the auxiliary springs. Further, upon these characteristics of the auxiliary springs will also depend the opposition they offer to rebound. After the two spring-arms reach alinement, the auxiliary spring is inoperative further to oppose rebound; and, depending upon the character of rebound snubbing desired, the auxiliary spring may be made weak enough so that its arms reach alinement before the snubber comes fully into play or strong enough so that it will still be operative throughout the complete extent of the largest rebound.

In Fig. 3, I have shown a snubber of the type illustrated in Fig. 1. In this view, however, I have shown the strap 15 as provided with two springs 35 which in general are similar to the spring 20 shown in Fig. 1, although they are shown as somewhat smaller than the spring 20 and hence is adapted to offer a smaller initial resistance to rebound and to reach the limit of their movement at an earlier point in the rebound movement. The provision of two of the springs 35 in the construction shown in Fig. 3 doubles the amount of rebound movement necessary to bring the snubber completely into action. It is to be noted that in Fig. 3 I have shown one of the springs 35 as located within the snubber casing and cooperating with one of the strap coils therein, while the other spring 35 is located on the straight stretch of strap extending to the axle. Locating one of the springs within the casing in no way modifies its effectiveness in operation, and it will operate satisfactorily in that location whether or not a second spring is provided in the straight stretch of the strap. Although the auxiliary springs shown in Fig. 3 are located on the opposite side of the strap 15 from the spring shown in Fig. 1, their location is immaterial; for a spring arranged as in Fig. 1 will operate satisfactorily even though located within the casing 16 and co-operating with a portion of the strap which forms the outer turn of the strap-coil.

In Fig. 4 I have shown a snubber similar to that shown in Fig. 1, but I have illustrated a device in which this snubber is combined with an entirely different form of auxiliary spring. In this structure, the auxiliary spring is in the form of a curved leaf spring 38 secured at one end against the inner surface of the circumferential wall of the casing 16 as by means of rivets 39. At its free end, the spring 38 is attached to a shoe 40 which acts on one of the turns of the strap 15. As shown in Fig. 4, the shoe 40 is located between the outer turn and the next adjacent inner turn of the strap, and the force exerted by the spring 38 on the shoe 40 tends to hold the shoe out of engagement with the adjacent inner strap-turn, thus deflecting the outer strap-turn from the position which it tends to assume when the strap 15 is placed under tension.

If desired, I may provide the spring 38 with an adjustment in the form of a bolt 41 which extends through the spring and through the circumferential wall of the casing 16. On its outer end, the bolt 41 is provided with a nut 42 which may be adjusted to move the adjacent point of the spring 38 toward or away from the casing wall. By adjusting the nut 42, it is possible to vary the extent of rebound which must occur before the snubber becomes completely active in resisting further rebound and also to vary the resistance the spring 38 offers to rebound.

In operation, the device shown in Fig. 4 has substantially the same effect as those shown in Figs. 1 to 3 inclusive. When rebound initially occurs, the strap 15 moves downward, this movement being opposed by the frictional drag of the last quarter-turn of the strap and also by the resistance offered by the spring 38. When rebound has progressed to a point where the shoe 40 engages the next adjacent inner strap-turn, or when the force of rebound becomes sufficient to move the inner strap-turns, further rebound is opposed by the friction between all the strap-turns.

In Fig. 5 I have shown a device embodying the form of shock absorber shown in Fig. 2. From the drum 25 of this shock absorber, the strap 26 extends downward and is attached at its lower end to the vehicle axle 45. Also attached to the vehicle axle is a leaf spring 46 which bears against the strap and deflects it from the straight-line position which it tends to assume under tension. Conveniently, the spring 46 is provided with a bent end 47 which overlies the end of the strap 46 and, together with such strap-end, is secured to the axle 45 as by means of one or more screws 48.

In this device, the initial effect of rebound is to deflect the spring 46 from the full line toward the dotted line position shown in the illustration. After rebound has progressed to a certain extent, the tension of the strap 26 becomes sufficient to rotate the drum 25. As in the case of the auxiliary spring shown in the devices previously described, the spring 46 may be made to produce the operating characteristic desired. In other words, it may be made weak enough so that it will reach the limit of its movement (the dotted line position shown) before the drum 25 begins to rotate, or it may be made strong enough so that the drum 25 begins to rotate while the spring 46 is still capable of some movement. In either case, it is desirable in the attainment of my object that the spring 46 have some movement to accommodate the initial rebound before the drum 25 begins to rotate.

In Fig. 6 I have again shown a snubber of the type shown in Figs. 1, 3, and 4. The auxiliary spring which I use in this device is in the form of a leaf spring 50 located between two turns, preferably between the outer turn and the next adjacent inner turn, of the strap 15. Attached to the spring 50 in spaced relation are two rigid ears 51 which extend through or around the outer strap-turn and are there provided with holes through which passes a rod 52. The ends of the rod 52 are threaded for the reception of nuts 53 between which and the ears 51 coil springs 54 act. The holes in the ear 51 through which the rod 52 passes are desirably somewhat larger than such rod in order that the rod itself will not interfere with bending of the spring 50.

The operation of this device is somewhat similar to that of the rebound check illustrated in Fig. 4. The leaf spring 50 tends to hold the outer strap-turn out of engagement with the next adjacent inner turn against any tension that may exist in the strap 15. The natural resilience of the spring 50 is increased by the springs 54 which tend to straighten the spring 50. In the operation of this device, initial rebound is opposed by the leaf spring 50 and the coil springs 54 and also by the frictional drag of the last quarter-turn of the strap 15. When rebound has progressed to a predetermined extent determined either by the stiffness of the springs 50 and 54 or by engagement of the spring 50 with the inner strap-turn immediately adjacent to the spring 50, all the turns of the strap 15 come into action and oppose further rebound.

In Fig. 7 I have shown still another type of auxiliary spring in combination with a shock absorber of the type shown in Figs. 2 and 6. This auxiliary spring is in the form of a leaf spring 56 which may have any desired number of leaves. At its ends, the spring 56 is provided with holes through which the strap 26 passes. At its center, the spring 56 is provided with a hole which receives a screw 57 having on one end a shoe 58 which engages the strap 26. Nuts 59 carried by the screw 57 and located on opposite sides of the spring 56 provide an adjustment whereby the distance between the shoe 58 and the spring 56 may be varied.

In common with the other devices described, the construction shown in Fig. 7 permits of a certain initial rebound unopposed by the total resistance of the shock absorber. When the strap 26 is placed under tension resulting from rebound, the strap tends to straighten and deflect the spring 56, thus providing for a certain degree of rebound without necessitating rotation of the drum 25. The distance between the shoe 58 and the spring 56 may be adjusted to vary the amount of rebound which occurs before the drum 25 begins to rotate.

In Figs. 8 and 9 I have illustrated a rebound-resisting device similar to that shown in Fig. 2, but I have added thereto a means for providing an adjustment of the spring. As has been stated above, the spring 27 is provided with two arms 27' which cross each other and have attached to their ends the shoes 28. To provide an adjustment for this spring, I insert between the crossed arms 27' the intermediate leg of a U-shaped bar 65 the ends of which pass through a rod 66 which extends through the inner coils of the spring 27. The ends of the bar 65 are threaded for the reception of nuts 67 by which the intermediate leg of the bar may be drawn toward the coils of the spring 27 to spread the arms 27' apart.

The adjustment provided in the construction shown in Figs. 8 and 9 is somewhat different in effect from the adjustment shown in Figs. 4, 6, and 7. In each of those constructions, adjustment to increase the strap tension necessary to produce deflection of the auxiliary spring tends to increase the amount of strap movement which can occur before the shock absorber or snubber offers its full resistance to rebound. In the construction shown in Figs. 8 and 9, the effect of such adjustment is to decrease the extent of strap movement which may occur before the arms of the spring reach alinement and the spring becomes inoperative.

All the structures which I have described are capable of operating to accomplish my object. That is, all these devices permit a certain initial rebound which is unopposed by the total resistance which the shock absorber or snubber is capable of offering. When this initial rebound is exceeded, the shock absorber or snubber comes into play and offers its full resistance to greater rebound. It is to be noted that this initial rebound which may occur before the shock absorber or snubber comes completely into action may be opposed not only by resilience of the auxiliary spring but also by a certain amount of frictional resistance. In auxiliary springs of the form shown in Figs. 1, 2, and 3 the spring-arms shorten as the spring is strained, and the strap slides over the ends of the spring-arms which offer a certain degree of frictional resistance. In Figs. 4 and 6, frictional resistance occurs against the last quarter turn of the strap as well as against those parts which deflect the strap from the position it tends to assume under tension. In Fig. 7, there is also friction, for the strap 26 moves in the holes through the ends of the spring 56 as such spring is deflected. There is probably also a certain amount of friction occurring between the auxiliary spring and the strap in the construction shown in Fig. 5, although the frictional resistance thus offered is much less in proportion than that occurring in other forms of my invention.

In all the modifications which I have illustrated, it will be evident that the auxiliary spring has a certain limiting position beyond which it cannot be strained in the operation of the rebound check, although the strap is subjected to the full load occurring during rebound. With the spring shown in Figs. 1, 2, and 3, this position is reached when the spring-arms come into alinement. In Fig. 5 the initial deflection of the auxiliary spring is limited by engagement of the auxiliary shoe 40 with the inner strap-turn adjacent to it, although further limited deflection of the spring 38 may occur as the main snubber shoes 12 and 13 approach each other. Substantially the same effect is reached in the construction shown in Fig. 7, while in Figs. 6 and 8 straightening of the strap 26 limits the deflection of the auxiliary spring.

Another feature possessed by all the modifications shown and described, is that the initial rebound is unopposed by the complete resistance of the shock absorber or snubber, such initial rebound being provided for by a resilient means which deflects the strap from the position it tends to assume under the tension resulting from rebound. In other words, the auxiliary spring, by working in opposition to the main spring which tends to draw the strap into a predetermined position, produces a certain amount of slack or excess length in the strap which is taken up on rebound against the yielding force exerted by the auxiliary spring.

I claim as my invention:—

1. In combination, a frictional rebound-resistor adapted to be mounted on one of two parts of a vehicle which tend to separate on rebound and having a strap for connection to the other of said two vehicle-parts, said strap being provided with a bight, and a coil spring acting between the ends of the bight and tending to draw such bight-ends together.

2. In combination, a frictional rebound-resistor adapted to be mounted on one of two parts of a vehicle which tend to separate on rebound and having a strap for connection to the other of said two vehicle-parts, said strap being provided with a bight, and a coil spring seated in said bight and having projecting arms which at their ends co-operate with the strap at the ends of the bight.

3. In combination, a frictional rebound-resistor adapted to be mounted on one of two parts of a vehicle which tend to separate on rebound and having a strap for connection to the other of said two vehicle-parts, said strap being provided with a bight, and two arms which engage the ends of said bight and are interconnected by a part seated in the base of the bight, said two arms being resiliently pressed together to move the bight ends toward each other.

4. In combination, a frictional rebound-resistor adapted to be mounted on one of two parts of a vehicle which tend to separate on rebound and having a strap for connection to the other of said two vehicle-parts, said strap being provided with a bight, and a spring acting between the two ends of said bight and tending to pull them together.

5. In combination, a frictional rebound-resistor adapted to be mounted on one of two parts of a vehicle which tend to separate on rebound and having a strap for connection to the other of said two vehicle-parts, said strap being provided with a bight, and two arms which engage the ends of said bight, said two arms being resiliently pressed together to move the bight ends toward each other.

6. In combination, a frictional rebound-resistor adapted to be mounted on one of two parts of a vehicle which tend to separate on rebound and having a flexible element for connection to the other of said two vehicle parts, and means acting on said flexible element at two spaced points to laterally deflect it yieldingly from the position it tends to assume when subjected to tension.

7. In combination, a frictional rebound-resistor adapted to be mounted on one of two parts of a vehicle which tend to separate on rebound and having a flexible element for connection to the other of said two vehicle parts, and means located apart from the connection of said flexible element to said last named vehicle part between said rebound-resistor and said last named vehicle-part and acting on said flexible element to deflect it yieldingly from the position it tends to assume when subjected to tension.

8. In combination, a frictional rebound-resistor adapted to be mounted on one of two parts of a vehicle which tend to separate on rebound and having a flexible element for connection to the other of said two vehicle parts, and yielding means exerting lateral pressure on said flexible element at two spaced points and yieldable to permit a limited initial rebound unopposed by the full resistance of said rebound-resistor.

9. In combination, a frictional rebound-resistor adapted to be mounted on one of two parts of a vehicle which tend to separate on rebound and having a flexible element for connection to the other of said two vehicle parts, said rebound-resistor including a spring which tends to draw said flexible element into a predetermined position, and resilient means carried by said flexible element for yieldingly holding a portion of said flexible element out of such position in opposition to the force of said spring.

10. In combination, a frictional rebound-resistor adapted to be mounted on one of two parts of a vehicle which tend to separate on rebound and having a flexible element for connection to the other of said two vehicle parts, and means for creating slack at an intermediate point in said flexible element, said means being yieldable to oppose yieldingly the taking up of said slack when rebound occurs.

11. In combination, a rebound-resistor adapted to be mounted on one of two parts of a vehicle which tend to separate on rebound and having a flexible element for connection to the other of said two vehicle parts, said rebound-resistor including a spring which tends to draw said flexible element into a predetermined position, and resilient means carried by said flexible element for yieldingly holding a portion of said flexible element out of such position in opposition to the force of said spring.

12. In combination, a rebound-resistor adapted to be mounted on one of two parts of a vehicle which tend to separate on rebound and having a flexible element for connection to the other of said two vehicle parts, and means for creating slack in said flexible element at an intermediate point thereof, said means being yieldable to oppose yieldingly the taking up of said slack when rebound occurs.

13. A device for opposing rebound in vehicles, comprising a flexible element acting between two parts of the vehicle which tend to separate on rebound, main friction means engaging a portion of said flexible element and adapted to oppose its movement under rebound, and spring means and auxiliary friction means co-operating with another portion of said flexible element and also adapted to oppose movement of said flexible element under rebound, said spring means and auxiliary friction means being arranged to offer less resistance to movement of said flexible element than does said main friction means, whereby rebound is initially unopposed by said main friction means.

14. In combination, a rebound-resistor adapted to be mounted on one of two parts of a vehicle which tend to separate on rebound and having a flexible element for connection to the other of said two vehicle parts, said rebound-resistor including a spring which tends to draw said flexible element into a predetermined position, and resilient means for yieldingly holding a portion of said flexible element out of such position in opposition to the force of said spring, said resilient means being adjustable to vary the amount of tension of said flexible element necessary to cause yielding of the resilient means.

15. In combination, a rebound-resistor adapted to be mounted on one of two parts of a vehicle which tend to separate on rebound and having a flexible element for connection to the other of said two vehicle parts, and means for creating misalinement in a portion of said flexible element, said means being yieldable to oppose yieldingly the straightening of said misalined slack-portion when rebound occurs, said means being adjustable to vary the amount of misalinement it creates.

16. In combination, a rebound-resistor adapted to be mounted on one of two parts of a vehicle which tend to separate on rebound and having a flexible element for connection to the other of said two vehicle parts, said rebound-resistor including a spring which tends to draw said flexible element into a predetermined position, and resilient means acting on said flexible element at two spaced points for yieldingly holding a portion of said flexible element out of such position in opposition to the force of said spring.

17. In combination, a frictional rebound-resistor adapted to be mounted on one of two parts of a vehicle which tend to separate on rebound and having a flexible element for connection to the other of said two vehicle parts, and means carried by and acting on said flexible element to deflect it yieldingly from the position it tends to assume when subjected to tension.

In witness whereof, I have hereunto set my hand at Indianapolis, Indiana, this 16th day of June, A. D. one thousand nine hundred and twenty-seven.

LOUIE H. OBERREICH.